July 20, 1954  L. A. WILLYARD ET AL  2,684,142
CLUTCH FOR RADIO CONTROLS
Filed July 19, 1949

L. A. Willyard
and J. W. Daniels,
INVENTORS,

BY
Homer R. Montague
ATT'Y.

Patented July 20, 1954

2,684,142

UNITED STATES PATENT OFFICE 2,684,142

CLUTCH FOR RADIO CONTROLS

Leslie A. Willyard and John W. Daniels, Los Angeles, Calif., assignors to Hoffman Radio Corporation, Los Angeles, Calif., a corporation of California Application July 19, 1949, Serial No. 105,564

1 Claim. (Cl. 192—67)

This invention relates in general to shaft couplings, and more particularly to shaft couplings of the quick disconnect type.

Although the invention is to be described and illustrated as it may be utilized for electronic equipment, the device may equally well be utilized in any application where a quick disconnect shaft coupling is desirable.

In some types of electronic equipment it is often desirable or necessary to utilize removable adjustable electrical components such as potentiometers, switches, condensers, tuners, et cetera, controlled by a knob from a main panel on which may be included calibrated indicia. This invention makes it possible to remove the sub-assemblies containing the various electrical components from behind such a main panel merely by an outward pull upon the control knob located on the outside of the panel.

It is an object of the invention to provide a quick disconnect shaft coupling which permits easy engagement and transmission of rotary motion regardless of slight angular misalignment of the shafts being connected.

Another object of the invention is to provide a quick disconnect shaft coupling in which the "disconnect" and "connect" positions are easily determined by the use of detents.

Still another object of the invention is to provide a quick disconnect shaft coupling in which the driven shaft can be easily returned to the original setting after that shaft has been disconnected and then re-coupled.

Another object of this invention is to provide a quick disconnect shaft coupling that may be engaged or disengaged without visual access to the mating surfaces of the driven and driving shafts.

It is another object of this invention to provide a quick disconnect shaft coupling in which the "disconnect" and "connect" positions are determined by detents, the driving shaft being engaged by a spring that remains in the same position regardless of shaft position, or removal of the shaft.

Still another object of this invention is the provision of a detent arrangement for quick disconnect shaft couplings in which a hairpin-shaped spring mounted in the control panel engages the detents.

Another object of this invention is to provide a quick disconnect shaft coupling in which the driven shaft may be disconnected without disturbing the setting or angular position of the driven shaft.

Figure 1:
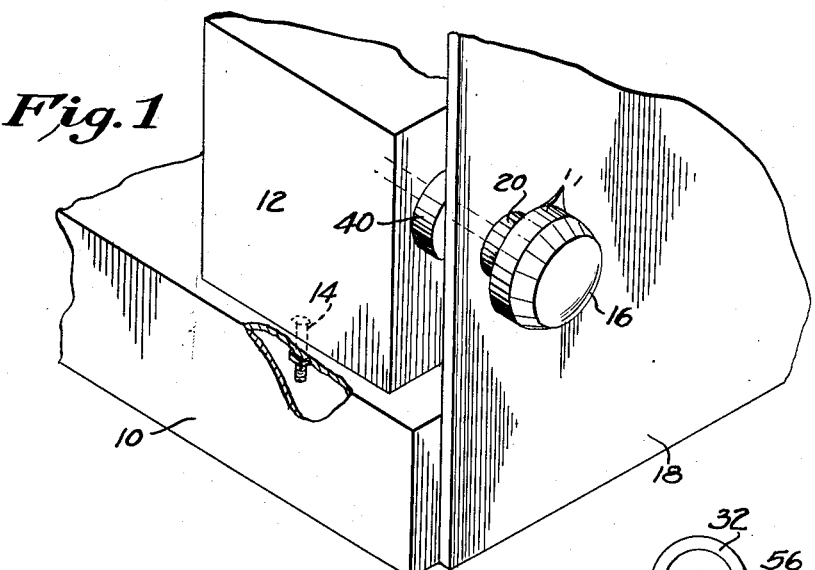
Figure 2:
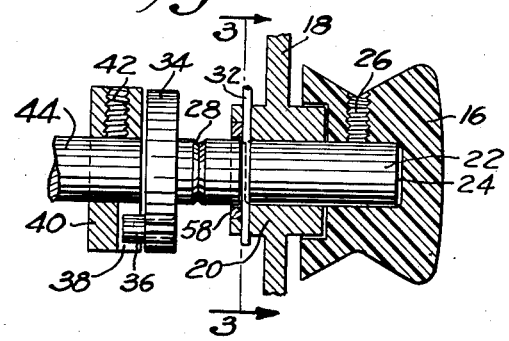
Figure 3:
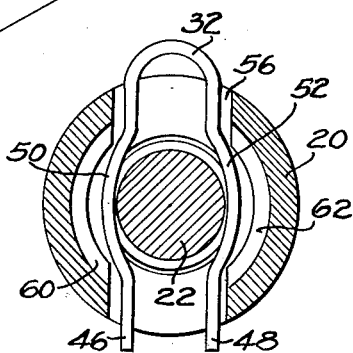
Figure 4:
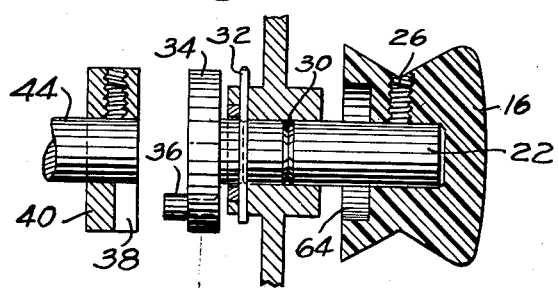

The above as well as other objects and advantages of this invention will become readily apparent when the following specification is read in conjunction with the accompanying drawings, in which Fig. 1 is an isometric view of the invention as utilized in an exemplary electronic equipment, Fig. 2 is a longitudinal cross-sectional view taken along a vertical plane of the shaft arrangement illustrated in Fig. 1, Fig. 3 is a vertical cross-sectional view taken along the cutting plane 3—3 of Fig. 2, and Fig. 4 is a longitudinal cross-sectional view similar to Fig. 2 but with the driver and driven shafts in the disconnected position.

Referring in detail to the drawings, reference numeral 10 designates a chassis, upon which is mounted an encased component 12 that can be fastened to the chassis 10 by means of a bolt or stud 14. The component 12 may be any electrical or electronic component such as a potentiometer, an intermediate frequency amplifier stage, a radio frequency amplifier stage or the like. The component 12 is adjusted by means of a knob 16 on the outside of panel 18. The panel 18, or knob 16 may be provided with indicia to show the setting or adjustment of the component 12.

In many instances it is desirable to remove the component 12 from the chassis 10 for purposes of inspection, replacement et cetera, without the necessity of removing or disturbing the knob 16 and the connecting driver shaft to the component. This invention permits removal of the component 12 from the chassis by unfastening the bolt or stud 14 and then lifting the component from the chassis after the shaft coupling has been disconnected. Other types of mounting than the bolt 14 may be used so that the component 12 may be removed from the chassis in a direction other than upwards.

The details of the shaft connections between the knob 16 and component 12 are clearly shown in Figs. 2, 3 and 4. The panel 18 is provided with a round boss or shoulder 20 through which passes a driver shaft 22. The round boss or shoulder 20 may be integral with the panel 18 or may be formed as a separate insert or bushing assembled thereto. The knob 16 is provided with a central opening 24 into which one end of the shaft 22 is fitted and held by a setscrew 26. The shaft 22 is provided with two annular detent grooves 28 and 30 which may be engaged selectively by a spring 32 to be described in detail later.

The inner end of the driver shaft 22 is provided with a cylindrical disc 34 from the outer face of which projects a short pin 36. The pin 36 is eccentrically mounted with respect to the disc 34, and is of such size as to permit entry thereof into a preferably radial slot 38 cut in a cylindrical disc 40 fitted upon the end of driven shaft 44 extending from the component 12. The driven disc 40 is fixedly mounted upon the driven shaft 44 as by means of a setscrew 42. The slot 38 is of such size as to permit easy entry of the pin 36 therein but not large enough to permit undue lost motion when rotation of shaft 22 is effected.

Fig. 2 illustrates the spring 32 engaging in the detent groove 30 which releasably holds the coupling in the "connect" position enabling the pin 36 to enter the slot 38 so that angular rotation of the shaft 22 will be transmitted through the coupling to shaft 44 of the component 12.

Fig. 4 illustrates the coupling in the "disconnect" position. By exerting an outward pull upon the knob 16, detent groove 30 is disengaged from the spring 32. Upon further outward movement of the shaft 22 the spring 32 snaps into the detent groove 28 and the pin 36 is withdrawn from contact with the edges of the slot 38 in disc 40. The coupling is releasably locked in the "disconnect" position by spring 32 in engagement with the walls of detent groove 28.

Fig. 3 illustrates the spring 32 and its mounting in detail. The spring 32 is formed in the shape of a hairpin, the distance between the legs 46 and 48 being considerably less than the diameter of the shaft 22 at the detent grooves 28 and 30. The legs 46 and 48 are bowed at 50 and 52 so that the distance between the legs at these points is also less than the diameter of the shaft 22 at the detents 28 and 30.

The shoulder 20 is provided with a vertical slot 56 into which is sprung the spring 32. The width of the neck of the slot 56 is less than the distance between the bowed portions 50, 52 of the spring 32 so that the spring cannot fall out of place even if the shaft 22 is completely removed from the panel 18. The rear side of the shoulder 20 has an annular recess somewhat larger than the diameter of the shaft 22 into which is fitted a retaining washer 58. The slot 56 is provided with shoulders 60 and 62 against which the retaining washer is pressed, and may be secured in place by staking or the like.

The disc 34 may be made integral with the shaft 22 or may be formed separately and mounted by suitable means on the end of shaft 22, so that by removing the disc 34, the shaft 22 may be completely removed by pulling outwardly upon knob 16. The rear face of the knob 16 is provided with a hollowed out portion 64 that enables the knob 16 to fit over the outer portion of the shoulder 20 when the coupling is in the "connect" position illustrated in Fig. 2.

Due to the construction described for retaining the spring 32 it is possible to replace the spring by merely pulling it upward and snapping it out of the slot 56.

Having thus described the invention, it is obvious that changes may be made from the arrangements described and illustrated without departing from the scope of the invention as set forth in the appended claim.

What is claimed is:

A shaft coupling apparatus comprising a driver shaft having detent grooves thereon, a driven shaft, a panel for supporting said driver shaft, an annular shoulder on said panel through which said driver shaft passes, a detent spring removably held within said shoulder on the inner face of said panel, said detent spring being of hairpin configuration, means to hold said detent spring in position regardless of the presence of the driver shaft, a disc mounted on one end of said driver shaft, a pin eccentrically mounted on said disc and extending outwardly therefrom, a cooperating disc on one end of said driven shaft, said cooperating disc provided with a slot to receive said pin, a control knob on the other end of said driver shaft for applying rotational force and also a longitudinal force to withdraw said pin from said slot and thereby disconnect the two shafts.

References Cited in the file of this patent

UNITED STATES PATENTS

| Number | Name | Date |
|---|---|---|
| 170,605 | Tucker | Nov. 30, 1875 |
| 796,205 | Graham et al. | Aug. 1, 1905 |
| 1,813,286 | Gewalt | July 7, 1931 |
| 2,021,241 | Mall | Nov. 19, 1935 |
| 2,214,730 | Jeffers | Sept. 17, 1940 |
| 2,276,777 | Horton | Mar. 17, 1942 |